United States Patent Office 2,702,121
Patented Feb. 15, 1955

2,702,121

METHODS OF FROTH-FLOTATION

Jules Colin and Robert Berthon, Mulhouse, France, assignors to Etablissement public dit: Mines Domaniales de Potasse d'Alsace, Mulhouse, France No Drawing. Application January 11, 1951,
Serial No. 205,608

Claims priority, application France January 11, 1950

4 Claims. (Cl. 209—166)

This invention relates to the froth-flotation separation of soluble constituents present in admixture in an ore or other materials.

In a prior French patent application filed by "Mines Domaniales de Potasse d'Alsace" on July 16, 1946, for "Method of Flotation of Sylvinite," there was described a method of flotation of sylvinite which involves treatment by an appropriate reagent in a medium consisting of mother-liquor, i. e. a solution saturated with KCl and NaCl at the ordinary temperature.

This method however offered a drawback where the sylvinite to be treated contained schists. The clays contained in the schists go into a suspension in the mother-liquor and it is essential to separate them from the solution prior to flotation. The mud that settles out contains, even after having been washed, a high proportion of mother-liquor which cannot thus be recovered, resulting in an appreciable reduction in the yield of KCl separation.

It is the object of this invention to provide a method free of this drawback.

Broadly, this method consists of separating by flotation one or more totally or partly soluble constituents from a material, by treating said material in an aqueous solution which is saturated both with the soluble salts of said materials and with one or more additional salts lower in commercial value than the constituent or constituents to be separated.

In applying the method to the flotation separation of sylvinite, the sylvinite material is treated in an aqueous solution which is saturated both with its soluble salts KCl and NaCl, and with at least one other salt lesser in value than the potassium chloride to be recovered.

In this way, the amount of KCl remaining in the residues is reduced and the yield of the operation increased. The low-grade soluble salts used in the method may comprise magnesium chloride, calcium chloride or any other salt of low commercial value.

Two examples of the practical use of the method of the invention are described in detail hereinafter by way of indication and not of limitation.

Example 1.—A raw sylvinite containing 31.5% KCl, 63.6% NaCl and 4.9% insolubles had a granulometrical analysis of from 0 to 1.17 mm. (0 to 14 mesh). This sylvinite raw material was treated in a solution saturated with KCl, NaCl and MgCl$_2$ at 15° C. and containing, per 1,000 grams water, 39 gr. KCl, 25 g. NaCl and 369 g. MgCl$_2$. For each kilogram of sylvinite 2.3 liters of the solution were used. The reagent used comprised aliphatic amine acetates with 16–18 carbon atoms, of which 120 grams were added per metric ton of the material. In the ensuing table, the results obtained by the method of the invention are given as compared with the results obtained by the older above-mentioned method consisting of treating the sylvinite by flotation in a solution saturated only with KCl and NaCl, at 15° C., and containing per 1,000 g. water, 136 g. KCl and 308 g. of NaCl.

| Solution consisting of | Mother-liquor saturated with KCl and NaCl | Aqueous solution saturated with KCl NaCl and MgCl$_2$ |
|---|---|---|
| | KCl Content, Percent | KCl Content, Percent |
| (a) Concentrates from 1st flotation step | 83.1 | 78.2 |
| (b) Residues or tailings | 6.4 | 3.9 |

The primary concentrates floated in both different solutions are floated again according to the method of the above identified application and the final concentrate contains on analysis, in either case, about 94% KCl. However, the losses sustained in the tailings are much lower in the new method for the same value of the final concentrate.

Example 2.—Deposits of sylvinite (mixed KCl and NaCl) and of carnallite, an ore having a composition corresponding to the formula KCl, MgCl$_2$, 6H$_2$O, are frequently found in the same geographical areas. The treatment of the mixture of carnallite and of other potassium compounds for the recovery of KCl, which is the only constituent of any commercial value, is done by washing the mixture at the ordinary temperature with solutions diluted in fresh water to dissolve the MgCl$_2$. The remaining solid product, resulting from a decomposition of the carnallite, is in the form of a fine material containing about 50% KCl, a percentage too low to make the product useable such as it is. The solutions which served to decompose the carnallite must then be subjected to an expensive heat treatment, or else cast away.

In the method of this invention, the solutions resulting from a washing of the carnallite, and containing about 50 grams KCl per liter, are placed into the flotation units together with the sylvinite and the solid product resulting from decomposition of the carnallite. The potassium chloride contained in the salts is recovered in the froth.

When using this procedure, therefore, the flotation liquid used, instead of being the mother-liquor NaCl—KCl which has a high value owing to its high KCl content, is MgCl$_2$, much lower in commercial value.

The amounts of the solution inevitably lost in the flotation residues and in the sludge formed by the schists placed in suspension during the various treatment steps, incur only a small lowering in the final yield, since the amount of KCl losses for an equal volume of solution lost, is reduced in proportion to the KCl content in the solutions.

It is to be understood that the invention is not restricted to the flotation of sylvinite in a solution saturated with KCl—NaCl and one or more other salts. It is equally applicable to the froth-flotation separation of any other materials, wholly or partly soluble, by the use of a solution saturated both with elements contained in the material to be treated and with one or more compounds foreign thereto.

What I claim is:

1. Method of separating KCl from sylvinite ore containing KCl, NaCl and insolubles, which comprises subjecting said ore to froth-flotation in a solution saturated with KCl and NaCl and a further water-soluble salt of lower commercial value, the last salt being added during the preparation of the solution, the amount of said salt used to produce this saturated solution being substantial, whereby the amount of KCl remaining in the tailings is substantially reduced.

2. Method as in claim 1 wherein said further salt is MgCl₂.

3. Method of separating KCl from a mixture containing KCl and NaCl which comprises subjecting the mixture to froth-flotation in a solution saturated with KCl, NaCl and MgCl₂, the last salt being added during the preparation of the solution and decreasing the solubility of KCl and NaCl, whereby the amount of KCl remaining in the tailings is substantially reduced.

4. Method of separating KCl from a mixture containing KCl and NaCl, said mixture comprising the KCl containing solid residuum of the decomposition of carnallite ore KCl, MgCl₂, 6H₂O resulting from washing said ore with water whereby there is obtained a saturated solution containing mostly MgCl₂ and some KCl and NaCl, and subjecting the aforesaid mixture to froth flotation in a solution saturated with KCl, NaCl and a substantial added amount of MgCl₂, said solution comprising the saturated KCl, NaCl and MgCl₂ solution used in decomposing said carnallite ore.

References Cited in the file of this patent

UNITED STATES PATENTS

| | | |
|---|---|---|
| 1,966,649 | Schrantz | July 17, 1935 |
| 2,088,325 | Kirby | July 27, 1937 |
| 2,382,360 | Weiner | Aug. 14, 1945 |
| 2,468,755 | Hoerr | May 3, 1949 |

FOREIGN PATENTS

| | | |
|---|---|---|
| 363,988 | Great Britain | Dec. 14, 1931 |
| 365,097 | Great Britain | Jan. 12, 1932 |